Figure 1:
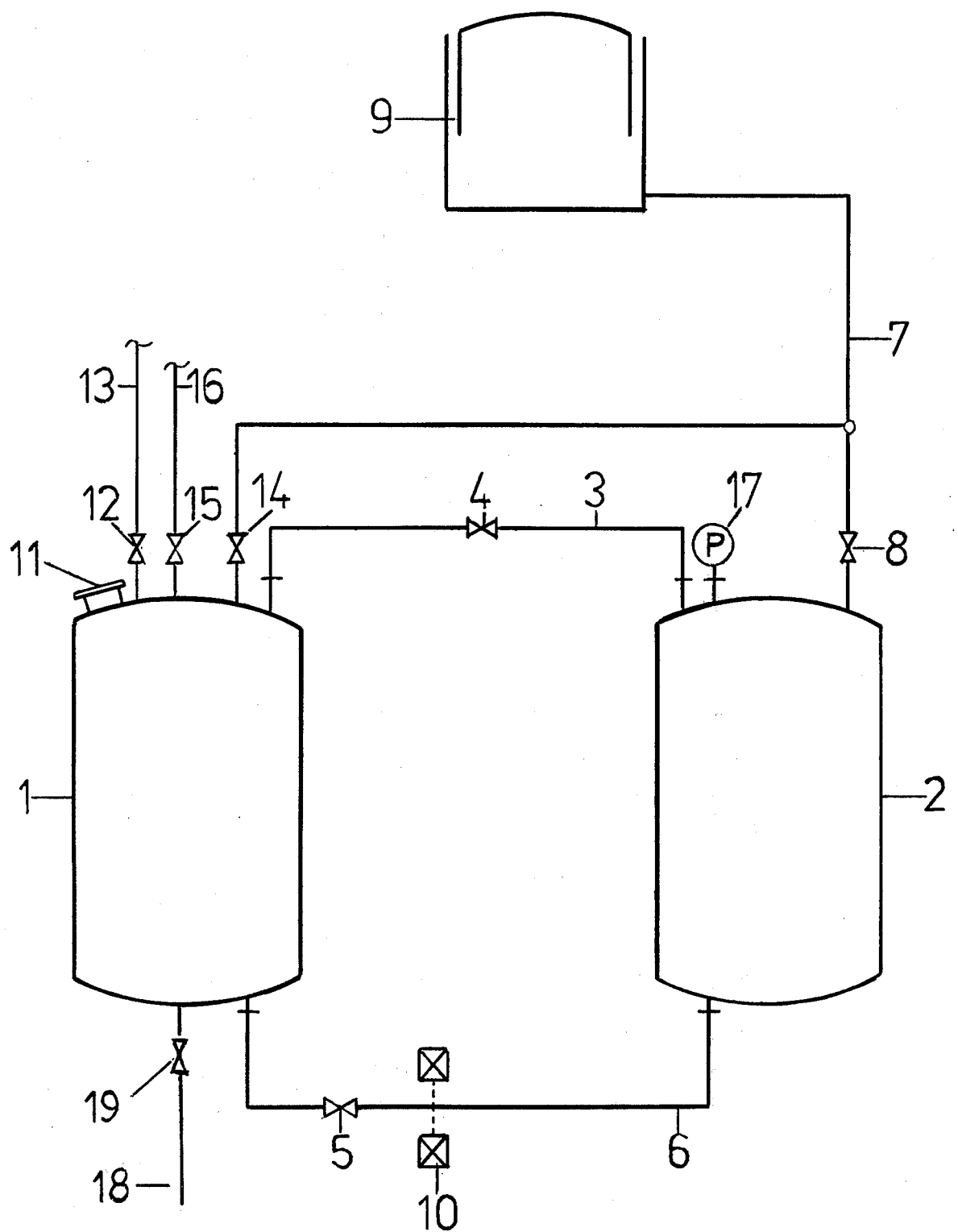

United States Patent [19]

Winter et al.

[11] 4,020,263
[45] Apr. 26, 1977

[54] PROCESS FOR THE PRODUCTION OF EMULSION POLYVINYL CHLORIDE UNDER AVOIDANCE OF VINYL CHLORIDE EMISSIONS

[75] Inventors: Hermann Winter; Alfred Lautsch; Karl-Heinz Schönberg; Jürgen Walther, all of Marl, Germany

[73] Assignee: Chemische Werke Huls Aktiengesellschaft, Marl, Germany

[22] Filed: Sept. 3, 1975

[21] Appl. No.: 610,069

[30] Foreign Application Priority Data

Sept. 5, 1974 Germany .......................... 2442575

[52] U.S. Cl. .................................. 526/88; 526/344
[51] Int. Cl.² ...................... C08F 3/30; C08F 1/98; C08F 1/13
[58] Field of Search .......... 260/92.8 W, 87.1, 86.3, 260/87.5, 87.7; 526/72, 88, 344, 345

[56] References Cited

UNITED STATES PATENTS

| | | |
|---|---|---|
| 2,979,492 | 4/1961 | Governale .................. 260/92.8 W |
| 3,317,449 | 5/1967 | Isaacs ........................ 260/85.5 XA |
| 3,669,946 | 6/1972 | Koyanagi .................... 260/87.5 R |
| 3,793,259 | 2/1974 | Brinkmann .................. 260/78.5 R |
| 3,842,055 | 10/1974 | Gabriel ............................. 260/87.1 |
| 3,926,931 | 12/1975 | Koyanagi .................... 260/92.8 W |

*Primary Examiner*—Christopher A. Henderson, Jr.
*Attorney, Agent, or Firm*—Millen & White

[57] ABSTRACT

Vinyl chloride emissions from the gaseous phase of large scale vinyl chloride batch emulsion polymerizations are reduced by discharging the liquid phase only of the polymerizate to a discharge zone at a pressure differential of 0.1–2.5 atmospheres lower than the reactor provided by residual vinyl chloride in the reactor, maintaining the reactor unopened; and then conducting another vinyl chloride polymerization in the reactor in the presence of the residual vinyl chloride from the prior polymerization.

8 Claims, 1 Drawing Figure

PROCESS FOR THE PRODUCTION OF EMULSION POLYVINYL CHLORIDE UNDER AVOIDANCE OF VINYL CHLORIDE EMISSIONS

BACKGROUND OF THE INVENTION

In the discontinuous polymerization of vinyl chloride by aqueous emulsion polymerization, it was originally necessary, as in other vinyl chloride polymerizations, to open the polymerization reactor for cleaning purposes between the polymerization cycles. Although the vinyl chloride content in the interior of the reactor was reduced to a minimum before opening the reactor by evacuation and purging with nitrogen, it was impossible to prevent comparatively large amounts of monomeric vinyl chloride from being emitted into the atmosphere during this operation.

By the introduction of the automatic hydrodynamic cleaning method, as described for example in Austrian Pat. No. 305,724, the opening of the reactor for cleaning purposes between polymerizations is no longer necessary. A cleaning device, operated by the hydrodynamic principle and designed to be pressure-proof, is connected with the reactor, for example above the reflux condenser, and this device is introduced into the reactor, as necessary, between the polymerization cycles. In this way, a manual cleaning operation has become superfluous.

In spite of the use of this hydrodynamic cleaning method, however, the emission into the atmosphere of monomeric vinyl chloride from the gas phase of the reactor between polymerization cycles in large-scale reactors, e.g., of a volume of 60 m$^3$ and above, was unavoidable.

In modern processes, high-percentage dispersions, i.e., of at least 48% by weight of monomer or solids content, are utilized for reasons of energy savings during the spray-drying and for a better utilization of the manufacturing units. In the formation of these dispersions, it is desirable to employ a minimum amount of emulsifier, since high emulsifier contents have a very deleterious effect in the final products and during the processing operation.

Therefore, modern processes operate, with monomer or solids contents of at least 48% by weight, with emulsifier contents of 0.9 - 0.4% by weight, based on the monomer. Such a process is described in German Published Application DAS 1,964,029.

When discharging such high-percentage, low-emulsifier dispersions from large reactors, e.g., with volumes of 60 m$^3$ or more, a considerable problem has evolved. For example, attempts to proceed analogously to the customary mode of operation employed in connection with small reactors, i.e., to discharge the dispersion by pumping, have failed when employed in connection with a large reactor.

Using a positive displacement pump, which is mechanically gentle to the dispersion, at most 20-30 tons of dispersion can be conveyed per hour. In such a case, it would require about 3 hours to empty a reactor of a capacity of 100 m$^3$ and 6 hours in case of the more conventional 200 m$^3$ reactors. Such consumption of time solely for the removal of the dispersion by pumping would unduly lengthen the preparation times between the polymerization processes and/or would considerably reduce the space-time yield of the large reactor.

However, the use of high-speed centrifugal pumps is not possible, since high-percentage, low-emulsifier dispersions do not withstand the high mechanical stresses associated therewith.

Therefore, heretofore large reactors have been emptied by expanding, after the end of the polymerizing step, the vinyl chloride monomer which is still under pressure into the gasometer, applying a vacuum, and then forcing the high-percentage dispersion through the discharge device with nitrogen. The vinyl chloride-nitrogen mixture remaining in the reactor after the discharging step then had to be blown off into the atmosphere, since a separation for a reuse of the vinyl chloride would be too expensive.

Consequently, not inconsiderable quantities of monomeric vinyl chloride were emitted. This method thus represented simultaneously a saving loss and also pollution of the environment. Moreover, the above-described mode of operation also required a great expenditure of time in case of large reactors, since the evacuation step, including the required vacuum tests, in a large reactor always took several hours.

These disadvantages of the previous mode of operation have been overcome by a process of this invention.

It is an object of this invention to reduce vinyl chloride emissions from the gas phase of large reactors into the atmosphere between emulsion polymerizing in the reactors. It is another object to provide a faster method of discharging high solids content polyvinyl chloride emulsions from large reactors. Other objects will be apparent to those skilled in the art.

SUMMARY OF THE INVENTION

This invention relates to a process for reducing the vinyl chloride emissions from the gaseous phase of reactors in which successive large scale vinyl chloride emulsion polymerizations are conducted at elevated temperature and pressure in the presence of excess vinyl chloride, which comprises the steps of discharging the liquid phase only of the polymerizate to a discharge zone at a pressure differential of 0.1–2.5 atmospheres lower than the reactor provided by residual vinyl chloride in the reactor; maintaining the reactor unopened; and then conducting another vinyl chloride polymerization in the reactor in the presence of the residual vinyl chloride from the prior polymerization.

In an apparatus aspect, this invention relates to apparatus for conducting the process of this invention.

DETAILED DISCUSSION

In a preferred embodiment a plurality of discontinuous (batch) high vinyl chloride- and low emulsifier-content, free-radical catalyst catalyzed aqueous emulsion polymerizations are conducted in large reactors while avoiding vinyl chloride emissions from the gas phase of the reactor into the atmosphere, employing pressure reactors having a volume (capacity) of at least 60 m$^3$. In this process, after termination of each polymerization, the polymer dispersion, i.e., the liquid phase of the polymerization charge, is discharged from the polymerization reactor into a discharge unit under a vinyl chloride pressure of 0.1–2.5 atmospheres. The polymerization reactor is maintained unopened between the polymerization operations, i.e., the gas phase of the polymerization charge is not discharged therefrom. Optionally, a conventional automatic hydrodynamic cleaning step is conducted between polymerizations. Preferably, the process is conducted in pressure reactors of at least 100 m³ capacity.

In a further preferred embodiment of the invention, the process is carried out in a manner which avoids any cakings on the wall. The expenditures for the cleaning step is thus also reduced and, in some cases, completely avoided.

DRAWINGS

The drawing shows schematically a polymerization system suitable for conducting the process of this invention.

A polymerization reactor 1 is connected to a discharge tank 2 via a discharge conduit 6 and a pressure equalizing line 3. Both conduits are provided with appropriate shutoff elements 4 and 5. A discharge conduit 6 is associated with a measuring instrument 10, which activates the closing of the shutoff element 5 once the polymerization reactor 1 has been emptied of the polymerization dispersion. A gasometer 9 for maintaining a pressure differential between reactor 1 and discharge tank 2 is connected via a conduit 7 by way of shutoff element 8 with the discharge tank 2 and by way of a shutoff element 14 with the polymerization reactor 1. The polymerization reactor 1 is equipped with a manhole 11 and, for when the polymerization is conducted in a conventional manner, also a vacuum line 13 with a shutoff element 12 and a nitrogen conduit 16 with a shutoff element 15. By a pressure gauge 17, the pressure in the discharge tank 2 is controlled via the shutoff element 8. Water, steam and the polymerization charge are produced via conduit 18 equipped with shutoff element 19.

The following is a description of a mode of operation of the process of this invention, employing the polymerization system shown in the drawing.

When the pressure in the polymerization reactor 1 has dropped to 4–5 atmospheres gauge, after the end of the polymerization step, the pressure is equalized via a pressure equalizing line 3 between the polymerization reactor 1 and the discharge tank 2, so that the pressure in both containers is 2.5–3.5 atmospheres gauge. After the pressure equalization has been established or nearly established, the shutoff element 4 in the pressure equalizing line 3 is closed. At this point, the shutoff element 5 between polymerization reactor 1 and discharge tank 2, on the one hand, and the shutoff element 8 between the discharge tank 2 and the gasometer 9, on the other hand, are opened, and the dispersion passes into the discharge tank under a pressure difference of 0.1–2.5 atmospheres, preferably 1–2 atmospheres, produced by the discharge of vinyl chloride from discharge tank 2 into gasometer 9. The expansion from the discharge tank 2 into gasometer 9 must be conducted to such an extent that, taking the changing levels in the polymerization reactor and in the discharge tank into account, a pressure difference between reactor 1 and discharge tank 2 of 0.1–2.5 atmospheres, preferably 1–2 atmospheres, is maintained.

If, toward the end of the discharge of the dispersion, the pressure in the polymerization reactor is not sufficient to discharge all of the dispersion into the discharge tank, it can be raised to the initial pressure by feeding a small amount of liquid vinyl chloride into the polymerization reactor or heating up the gas phase of the reactor by feeding an appropriate amount of vapor to it, thus giving rise to pressure. When the polymerization reactor becomes empty can be determined by a level indicator 10, e.g., radioactive, in the discharge conduit 6. The pressure equalization between the polymerization reactor 1 and the discharge tank 2 is necessary, because at a pressure difference of more than 2.5 atmospheres, dispersions having a high solids content and a low emulsifier content, tend to precipitate.

Pressure vessels for carrying out the polymerization are large, commercial size, e.g., having a volume of at least 60 m³. Particularly suitable are those having a capacity of 100–250 m³, especially 100–200 m³. These pressure vessels, i.e., polymerization reactors, have in general a technically conventional reactor shape. These reactors, due to their size, contain an agitator element which is driven from the bottom of the reactor. Suitably, the polymerization reactor contains a reflux condenser, because with reactors of the sizes employed in this process, cooling through the reactor wall is generally insufficient to remove the heat of polymerization rapidly enough when the polymerization is conducted at reasonable rates.

The device for the hydrodynamic cleaning step is suitably arranged above the reflux condenser, and the cleaning unit is introduced, if necessary, through a well in the zone of the reflux condenser. (See Austrian Pat. No, 305,724, Claim 5.) The cleaning device is pressure-proof. The discharge tank must have at least the volume of the polymerization reactor. Suitably, volume of the discharge tank is larger, e.g., 1½ times the volume, than the polymerization reactor.

The polymerization is preferably conducted with dispersions having high vinyl chloride to water ratios, preferably continuing the polymerization to an emulsion having at least 48% by weight solids content, e.g., 48 to 54%. The polymerization is also preferably conducted with low, e.g., up to 0.9% by weight, preferably 0.4% to 0.7% by weight, emulsifier content, based on the weight of vinyl chloride. A mode of operation permitting the manufacture of such high-percentage, low-emulsifier dispersions is described in German Application DAS 1,964,029, published July 18, 1974, whose disclosure is incorporated by reference, according to which the emulsifier is added continuously during the polymerization in a specific manner.

Suitable catalysts are the conventional free radical catalysts, e.g., the water-soluble compounds customary in emulsion polymerization, e.g., hydrogen peroxide and sodium persulfate, in the usual concentration. Potassium persulfate is preferred. The concentration of catalyst is 0.1–5.0% by weight, preferably 0.5–2.0% by weight, based on the monomer. Conventional emulsifiers can be used. Particularly suitable are ionic emulsifiers, e.g., salts of carboxylic acids, such as sodium caprate, sodium laurate, sodium myristate, sodium palmitate. Also suitable are salts of primary and secondary alkyl sulfates, e.g., sodium capryl sulfate, sodium lauryl sulfate, sodium myristyl sulfate and sodium oleyl sulfate, and sulfates of esterified polyoxy compounds, e.g., mono-fatty acid glycerin sulfuric acid esters, salts of primary and secondary alkyl sulfonates, e.g., sodium ethyl sulfonate, sodium stearyl sulfonate, sodium oleyl sulfonate, n-alkanesulfonates with a statistical distribution of the sulfonic acid group and with a chain length of $C_{13}$–$C_{17}$. It is also possible to utilize alkylaryl sulfonates, e.g., the sodium salt of p-n-dodecylbenzenesulfonic acid.

Mixtures of emulsifiers are also suitable. Auxiliary substances can additionally be admixed with the aforementioned emulsifiers, for example, an alcohol, e.g., lauryl alcohol, and esters such as sorbitan monolaurate and carboxylic acid glycol esters.

The polymerization is generally conducted at a temperature of 40°–70° C., depending on the desired K-value.

By the method described in U.S. Pat. No. 3,966,695 whose disclosure is incorporated by reference, i.e., by the use of polymerization reactors, the surfaces of whose inner walls and installations and coolers within the reactor consist of nickel, it is possible to avoid cakings of polymer practically completely. By the use of such measures, cleaning costs will also be considerably reduced.

The polymerization charge can be heated by the direct feeding of steam, as described in German Published Application DAS 2,257,025, published Sept. 1, 1975.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

As illustrated schematically in the drawing, with shut-off elements 4, 5, 12, 14 and 15 closed, a 200 m³ polymerization reactor 1, which is under a slight excess (over ambient pressure) vinyl chloride pressure, is charged via conduit 18 with a portion (40.000 kg.) of the required water, containing 15 kg. of potassium persulfate (0.25% by weight, based on the monomer). After heating to the polymerization temperature of 54° C. by the direct introduction of steam via conduit 18, 65 tons of vinyl chloride, as well as emulsifying water and hydrogen peroxide (as required) are continuously pumped via conduit 18 into polymerization reactor 1 over a period of 4 hours. The polymerization is continued adiabatically. After the polymerization has terminated as evidenced by a pressure drop, pressure equalization is established or nearly established between polymerization reactor 1 and discharge tank 2 by opening shutoff element 4 in pressure equalizing line 3, resulting in a pressure level of about 3.0 to 3.5 atmospheres in both vessels 1 and 2; e.g., 3.2 atmospheres in reactor 1 and 3.0 atmospheres in vessel 2. This pressure level depends, for example, on how soon one terminates polymerization, or how the ratio in gas phase volume between reactor 1 and vessel 2 is established.

Then, gas equalizing line 3 between the polymerization reactor and discharge tank 2 is closed by actuating shutoff element 4. At this point, shutoff element 5 in conduit 6 between polymerization reactor 1 and discharge tank 2, as well as shutoff element 8 in pressure expansion line 7 between discharge tank 2 and gasometer 9 are opened thus expanding the pressure in vessel 2 appropriately, and the dispersion flows into discharge tank 2 under the higher vinyl chloride pressure in reactor 1. Once polymerization reactor 1 is empty of liquid as detected by radioactive level indicator 10 in discharge conduit 6, shutoff element 5 is closed and the closed-vessel rinsing and cleaning operation is conducted in a vinyl chloride atmosphere, using the automatic hydrodynamic cleaning device (not shown) described in Austrian Pat. No. 305,724, whose disclosure is incorporated by reference. The cleaning water is freed in a separate column of vinyl chloride, and then is collected and reused. After the cleaning step, the polymerization reactor, still with its vinyl chloride atmosphere, is free to be filled with the water for the next batch polymerization, which is conducted as described for the first batch. The emulsion in vessel 2 is in the meantime to be degased either in vessel 2 itself or in the appropriate apparatus to which it is pumped continually or semicontinually on its way to e.g., spray drying.

COMPARATIVE EXAMPLE 2

A 200 m³ polymerization reactor 1, which is filled with air, is charged with an initial amount of water and a catalyst, dissolved in water. The manhole 11 is closed and a pressure test is conducted (about 1 hour). Then, the polymerization reactor 1 is evacuated by opening the shutoff element 12 in the vacuum line 13 (about ½ hour). As in Example 1, the polymerization reactor is then brought to the desired temperature by the direct feeding of steam and the same amount of the vinyl chloride, emulsifier, water and catalyst solution into reactor 1 via conduit 18 is metered amounts over a period of 4 hours. After termination of the polymerization, as evidenced by a drop in pressure, the polymerization reactor is expanded to about 0.5 atmosphere gauge, by opening shutoff element 14, via conduit 7 to gasometer 9 (about 2 hours), and by introducing nitrogen under pressure from conduit 16 after opening shutoff element 15, the dispersion is forced into discharge tank 2. Thereafter, the polymerization reactor 1 is purged with nitrogen, manhole 11 is opened for rinsing and cleaning with a compressed-water cleaning device.

The loss and/or emission of vinyl chloride from the gaseous phase of reactor 1 into the atmosphere is at least 300 kg. The additional amount of time expended, compared to Example 1, is about 3½ hours.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the batch polymerization of vinyl chloride in which successive large scale chloride emulsion polymerizations are conducted at an emulsifier level of up to 0.9% by weight, based on the vinyl chloride, in a reactor at elevated temperature and pressure to a solids content of at least 48%, in the presence of sufficient excess vinyl chloride to maintain gaseous vinyl chloride in the reactor under pressure at the end of the polymerizations, and the polymerizate is discharged from the reactor between polymerizations, the improvement which comprises reducing vinyl chloride emissions from the gaseous phase of the reactor by discharging the liquid phase only of the polymerizate to a closed discharge zone at a pressure differential of 0.1–2.5 atmospheres lower than the reactor, provided by the residual vinyl chloride in the reactor; maintaining the reactor unopened between polymerizations; and then conducting another vinyl chloride polymerization in the reactor in the presence of the residual gaseous vinyl chloride remaining in the reactor from the prior polymerization.

2. A process according to claim 1 wherein the pressure in the reactor at the end of the polymerization is more than 2.5 atmospheres higher than the discharge zone, the discharge zone is in closed circuit relationship with the reactor and a pressure differential of 0.1–2.5 atmospheres between the reactor and the discharge zone is produced by venting vinyl chloride from the reactor to the discharge unit.

3. A process according to claim 1 wherein the reactor is cleaned between polymerizations without venting the vinyl chloride therefrom.

4. A process according to claim 1 wherein the reactor has a volume of at least 60 m$^3$.

5. A process according to claim 1 wherein the polymerization is conducted to a solids content of at least 48%, and at an emulsifier level of up to 0.9% by weight, based on the vinyl chloride and wherein the pressure in the reactor at the end of the polymerization is more than 2.5 atmospheres higher than the discharge zone, the discharge zone is in closed circuit relationship with the reactor, and a pressure differential of 0.1–2.5 atmospheres between the reactor and the discharge zone is produced by venting vinyl chloride from the reactor to the discharge unit.

6. A process according to claim 5 wherein the reactor is cleaned between polymerizations without venting the remaining vinyl chloride therefrom.

7. A process according to claim 6 wherein the reactor has a volume of at least 100 m$^3$ and the polymerization is conducted at an emulsifier level of 0.4 to 0.7% by weight and to a solids content of 48 to 54%.

8. A process according to claim 5 wherein the polymerizate is discharged from the reactor to the discharge zone after reducing the pressure differential therebetween by placing them in liquid communication only and venting the vinyl chloride from the discharge unit to gasometer.

* * * * *